United States Patent [19]
Creger et al.

[11] Patent Number: 6,119,786
[45] Date of Patent: Sep. 19, 2000

[54] METHOD AND APPARATUS FOR CONTROLLING A HITCH SYSTEM ON A WORK MACHINE

[75] Inventors: Todd D. Creger, Metamora; Ronnie L. Satzler, Princeville, both of Ill.

[73] Assignee: Caterpillar Inc., Peoria, Ill.

[21] Appl. No.: 09/394,144

[22] Filed: Sep. 10, 1999

[51] Int. Cl.[7] .................................................. A01B 63/112
[52] U.S. Cl. ...................................................... 172/7; 701/50
[58] Field of Search .................................. 37/348; 172/2, 172/4, 4.5, 7, 8; 701/50

[56] References Cited

U.S. PATENT DOCUMENTS

| | | | |
|---|---|---|---|
| 3,825,072 | 7/1974 | Collins | 172/7 |
| 4,173,259 | 11/1979 | Heckenkamp | 172/10 |
| 4,518,044 | 5/1985 | Weigardt et al. | 172/7 |
| 5,421,416 | 6/1995 | Orbach et al. | 172/4 |
| 5,469,921 | 11/1995 | Orbach et al. | 172/4 |
| 5,472,056 | 12/1995 | Orbach | 172/2 |
| 5,682,954 | 11/1997 | Burns | 172/7 |

*Primary Examiner*—Robert E. Pezzuto
*Attorney, Agent, or Firm*—Steve D. Lundquist

[57] ABSTRACT

A method and apparatus for controlling a hitch system on a work machine, the hitch system having a work implement attached. The method and apparatus includes determining at least one force applied to at least one of the work machine and the work implement, determining at least one distance from a predetermined point on the hitch system to a desired at least one point on at least one of the work machine and the work implement, calculating at least one moment for at least one of the work machine and the work implement, responsively determining a desired pressure to apply to a powered linear actuator located on the hitch system to obtain a desired load distribution point on the work machine, and applying the desired pressure to the powered linear actuator.

31 Claims, 8 Drawing Sheets

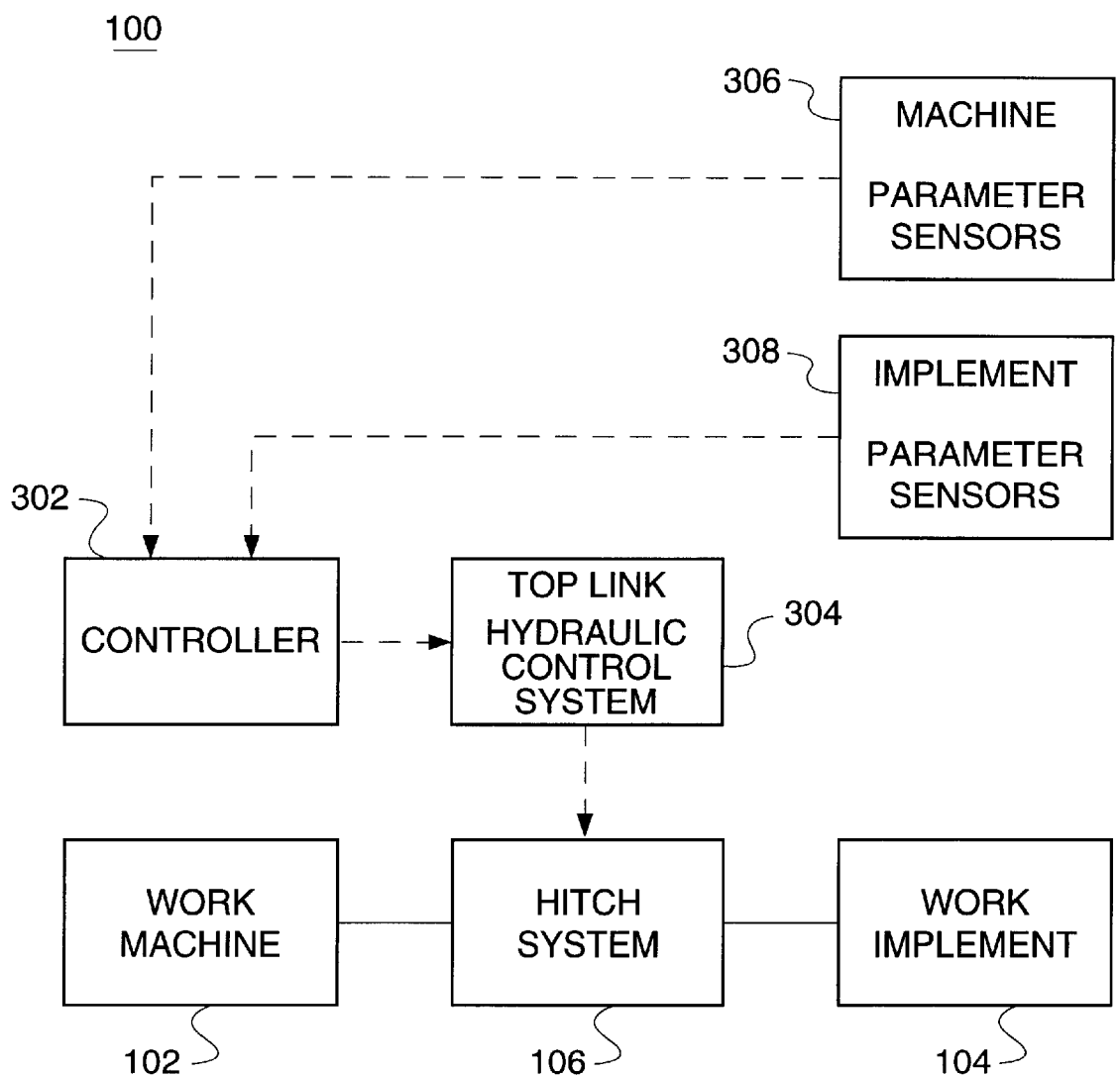

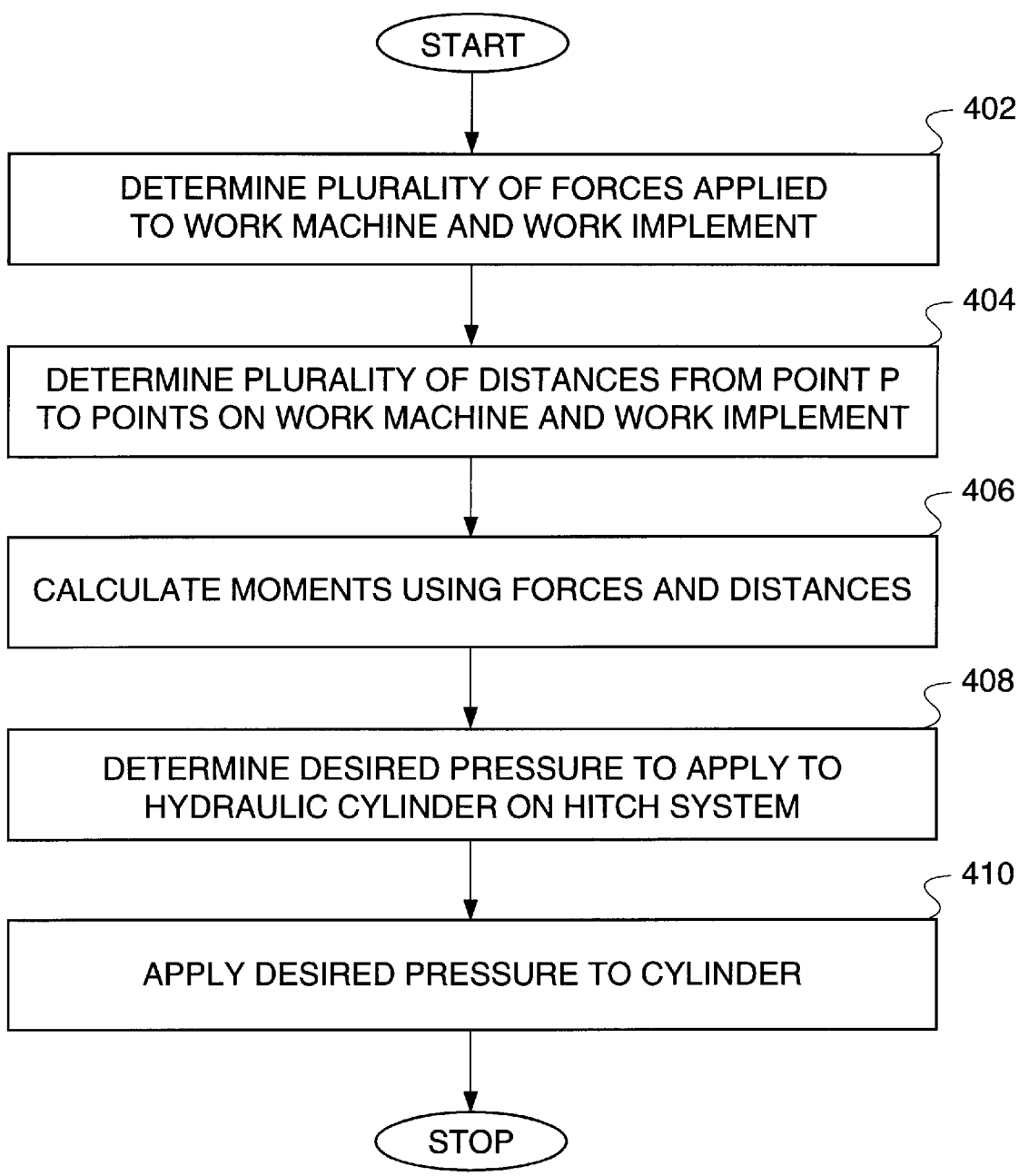

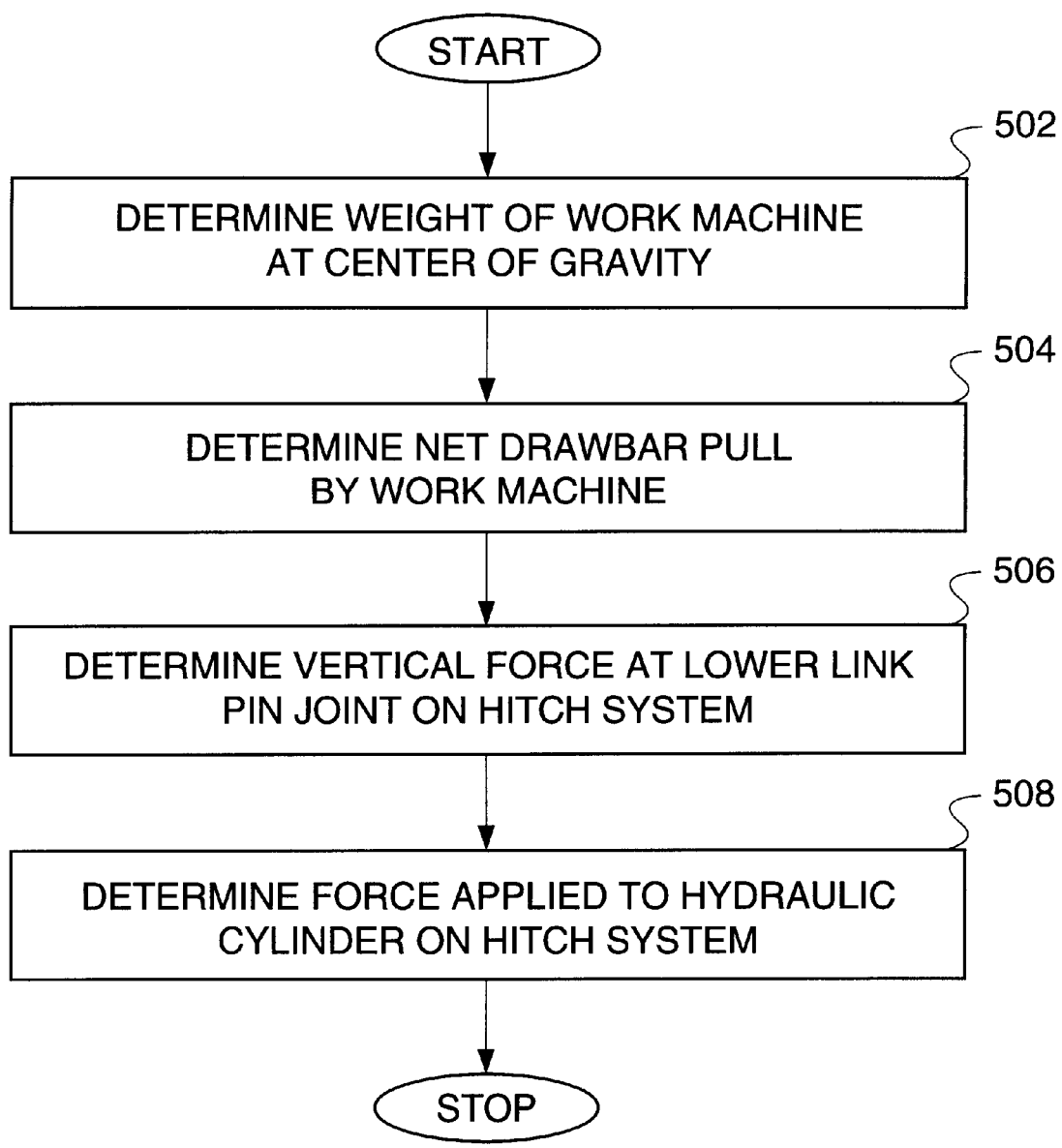

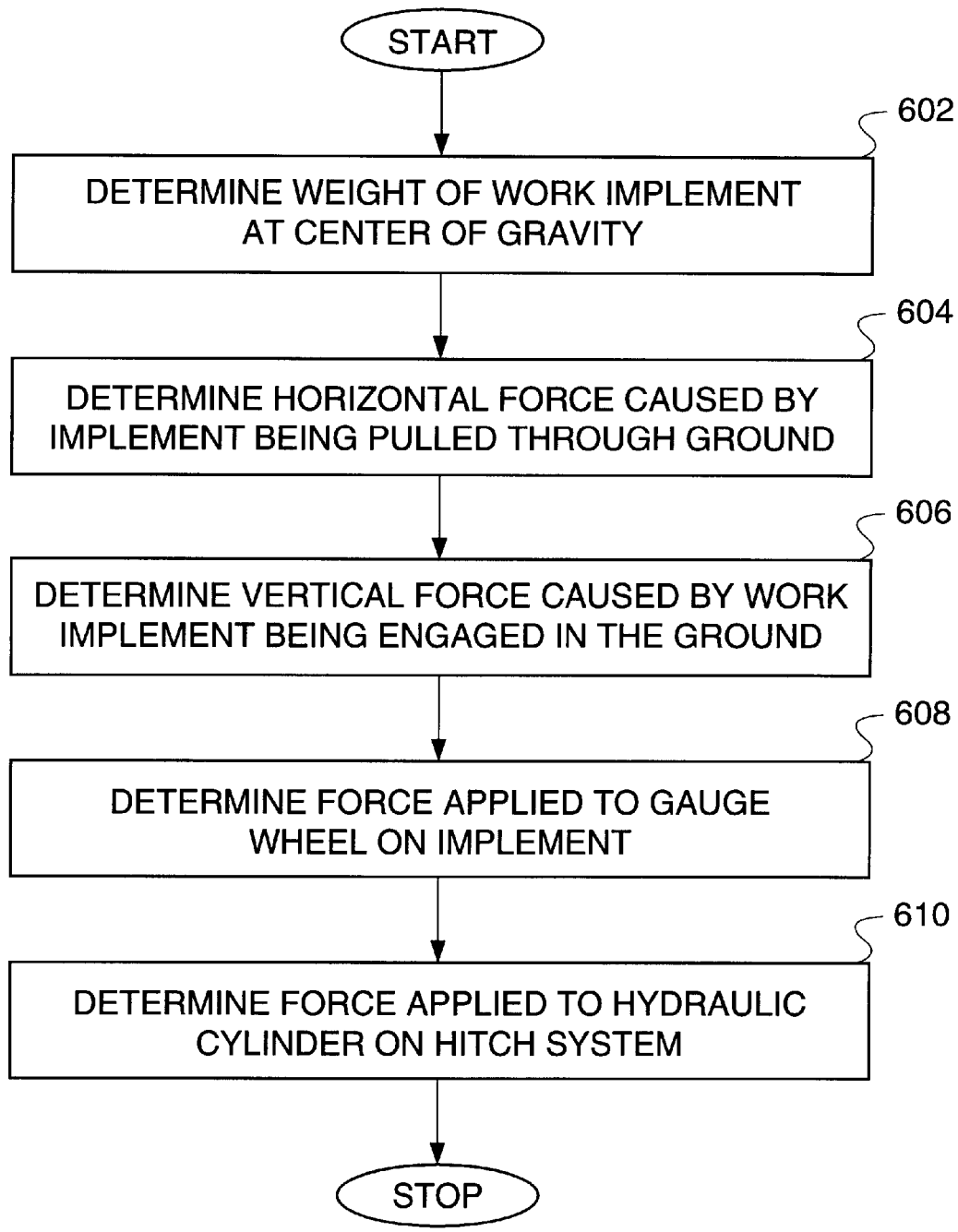

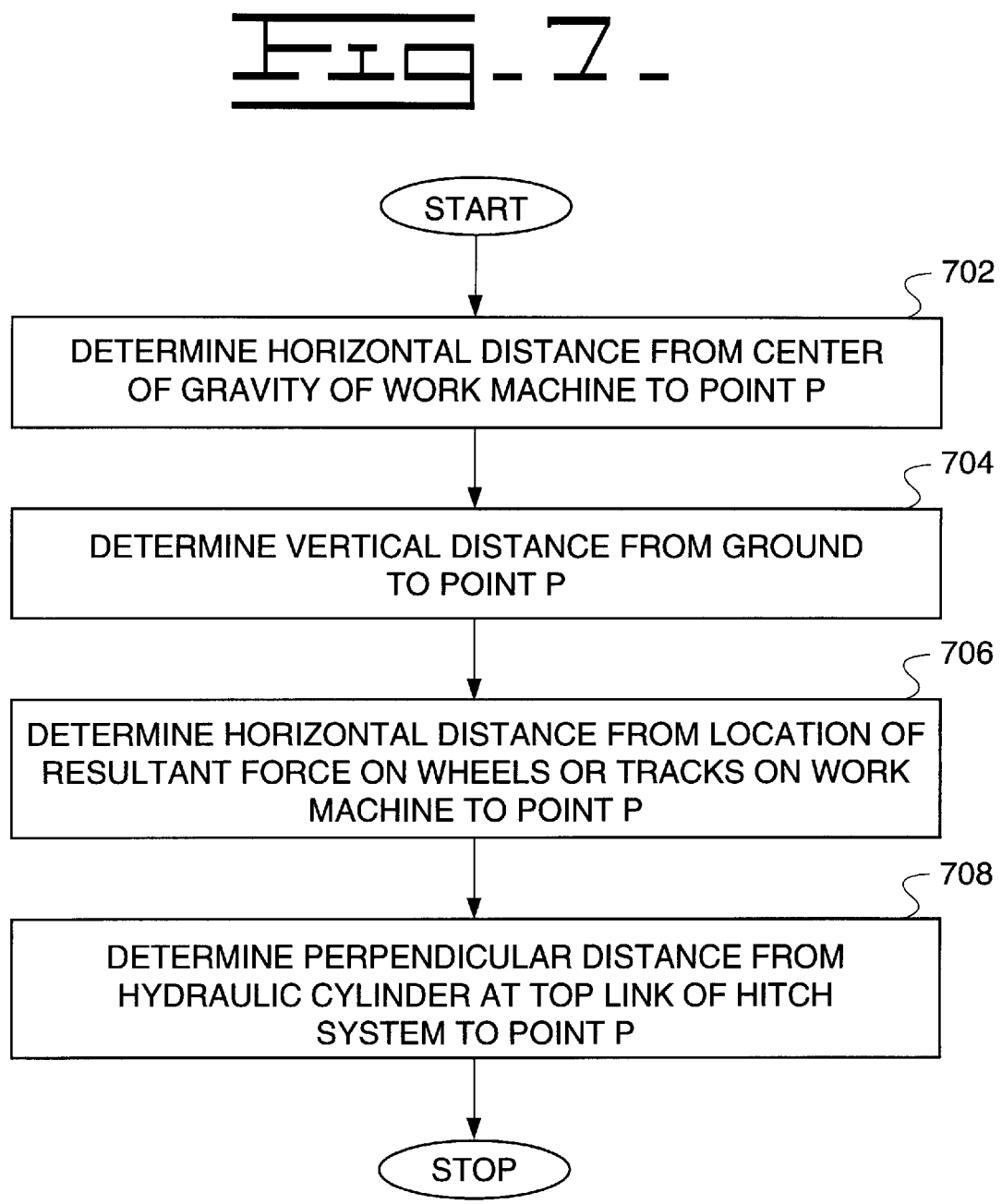

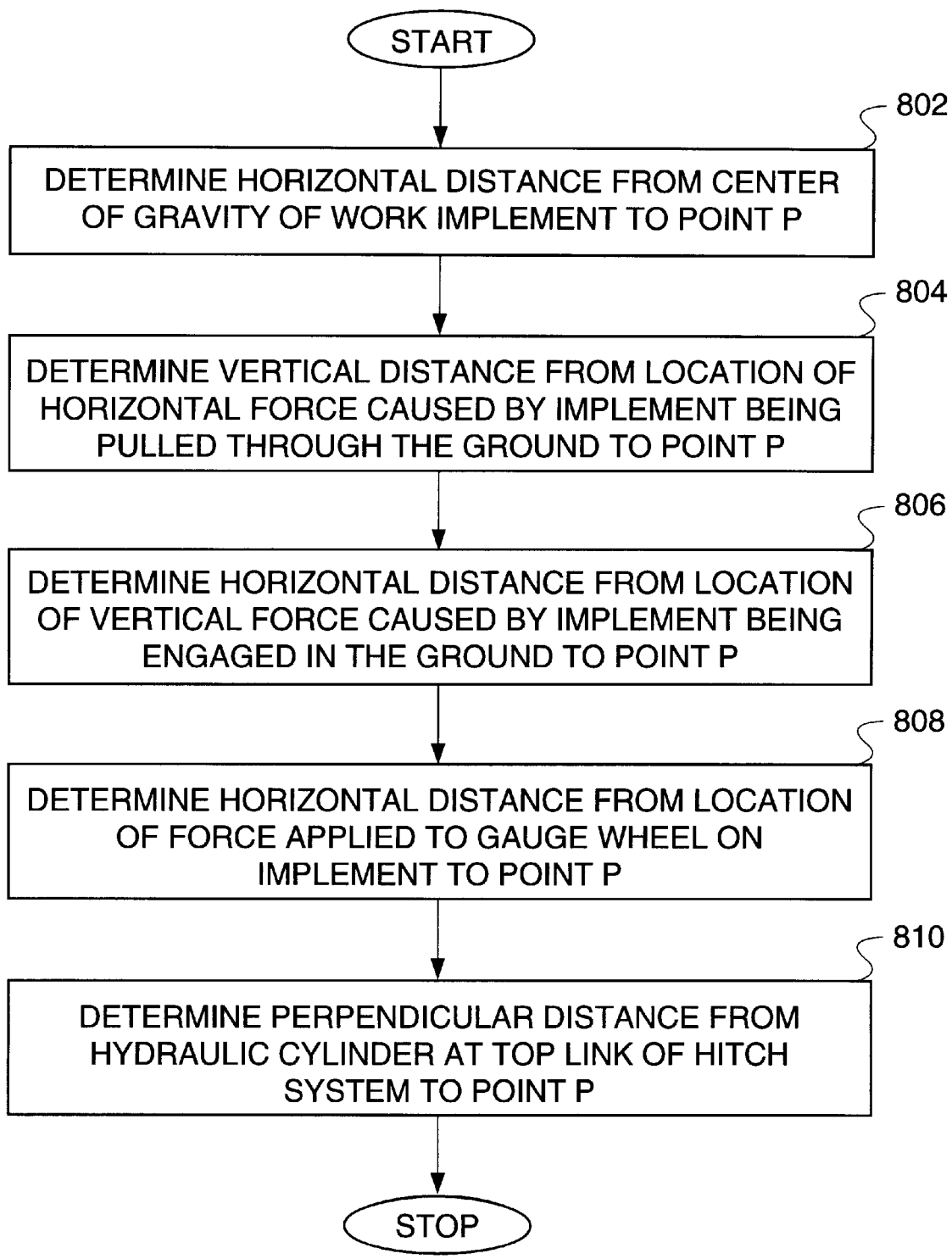

METHOD AND APPARATUS FOR CONTROLLING A HITCH SYSTEM ON A WORK MACHINE

TECHNICAL FIELD

This invention relates generally to a method and apparatus for controlling a hitch system on a work machine and, more particularly, to a method and apparatus for controlling a load distribution on the work machine of a work implement attached to the hitch system.

BACKGROUND ART

Work machines, such as agricultural tractors, are commonly used to pull ground-engaging work implements, e.g., plows, disks, cultivators, and the like through the earth to perform desired work functions. As the machines pull the implements, it is common for the characteristics of the earth to provide a varying degree of resistance to the implement as it works the ground. This resistance must be overcome by the machine to allow continuous movement along the terrain.

Quite often, the resistance provided by the ground-engaging implement must be compensated for to allow the machine to traverse the terrain as desired. For example, if the resistance increases beyond certain values, the work machine may begin to stall, or the tires or tracks of the machine may slip on the ground. Typically, the excess resistance is compensated for by raising the implement until the resistance is within acceptable limits.

As an example of an attempt to compensate for ground resistance caused by a ground-engaging implement, in U.S. Pat. No. 4,518,044, Wiegardt et al. (Wiegardt) monitors various parameters on a tractor such as wheel slip, engine speed, draft force, and implement position, and responsively raises or lowers the implement to balance implement resistance with a desired implement depth. Sensors on the draft links or drawbar of a three point hitch are used to sense draft load. Although Wiegardt may control the resistance of the implement, a major disadvantage is that the implement cannot be maintained at the desired working depth, thus sacrificing work efficiency and accuracy. In addition, some of the monitored parameters, e.g., wheel slip and engine speed, indicate the need to take corrective action after a problem has begun. For example, the detection of wheel slip indicates that the implement resistance has already exceeded a desired tolerance, and thus the increased resistance has already caused problems.

Attempts have been made to control implement resistance with greater precision and responsiveness. For example, it is known that control of the depth, and therefore the resistance, of a ground-engaging implement can be used to shift the load point on the tractor itself; that is, the load on the tractor may be shifted along the longitudinal length of the tractor to a desired point. It may be desired to maintain a load on the tractor during normal operating conditions that is balanced at about the center portion of the tractor, and shift the load point to the drive engaging wheels, e.g., the rear wheels, during periods of excessive implement resistance when wheel slippage is likely. The additional load placed on the drive wheels places more weight on the wheels and reduces wheel slip.

In U.S. Pat. No. 3,825,072, Collins discloses a system which senses draft load on the upper link of a three point hitch, and responsively raises or lowers the implement to distribute the weight, i.e., load, on a tractor to provide increased traction when needed. Once again, however, the implement is not maintained at a constant desired depth, so productivity and accuracy is sacrificed for the sake of increased traction.

It is desired to provide a method for shifting the load on a work machine to a desired location without changing the working depth of the implement being pulled by the machine.

The present invention is directed to overcoming one or more of the problems as set forth above.

DISCLOSURE OF THE INVENTION

In one aspect of the present invention a method for controlling a hitch system on a work machine, the hitch system having a work implement attached, is disclosed. The method includes the steps of determining at least one force applied to at least one of the work machine and the work implement, determining at least one distance from a predetermined point on the hitch system to a desired at least one point on at least one of the work machine and the work implement, calculating at least one moment for at least one of the work machine and the work implement, responsively determining a desired pressure to apply to a powered linear actuator located on the hitch system to obtain a desired load distribution point on the work machine, and applying the desired pressure to the powered linear actuator.

In another aspect of the present invention an apparatus for controlling a hitch system on a work machine, the hitch system having a work implement attached, is disclosed. The apparatus includes means for determining a plurality of forces applied to at least one of the work machine and the work implement, means for determining a plurality of distances from a predetermined point on the hitch system to a desired plurality of points on at least one of the work machine and the work implement, means for calculating a plurality of moments for at least one of the work machine and the work implement, means for responsively determining a desired pressure to apply to a powered linear actuator located on the hitch system to obtain a desired load distribution point on the work machine, and means for applying the desired pressure to the powered linear actuator.

In yet another aspect of the present invention an apparatus for controlling a hitch system on a work machine, the hitch system having a work implement attached, is disclosed. The apparatus includes a plurality of machine parameter sensors for determining a plurality of parameters of the work machine, and a plurality of implement parameter sensors for determining a plurality of parameters of the work implement. The apparatus further includes a controller for receiving the parameters of the work machine and the work implement, determining at least one force applied to at least one of the work machine and the work implement, determining at least one distance from a predetermined point on the hitch system to a desired at least one point on at least one of the work machine and the work implement, calculating at least one moment for at least one of the work machine and the work implement, and responsively determining a desired pressure to apply to a powered linear actuator located on the hitch system. In addition, the apparatus includes a top link control system for receiving a desired pressure signal from the controller and responsively applying the desired pressure to the powered linear actuator to obtain a desired load distribution point on the work machine.

BRIEF DESCRIPTION OF THE DRAWINGS

FIG. 3 is a block diagram illustrating an embodiment of an apparatus of the present invention;

FIG. 4 is a flow diagram illustrating a preferred embodiment of a method of the present invention;

FIG. 5 is a flow diagram illustrating an aspect of the present invention;

FIG. 6 is a flow diagram illustrating another aspect of the present invention;

FIG. 7 is a flow diagram illustrating yet another aspect of the present invention; and FIG. 8 is a flow diagram illustrating still another aspect of the present invention.

BEST MODE FOR CARRYING OUT THE INVENTION

Figure 1:
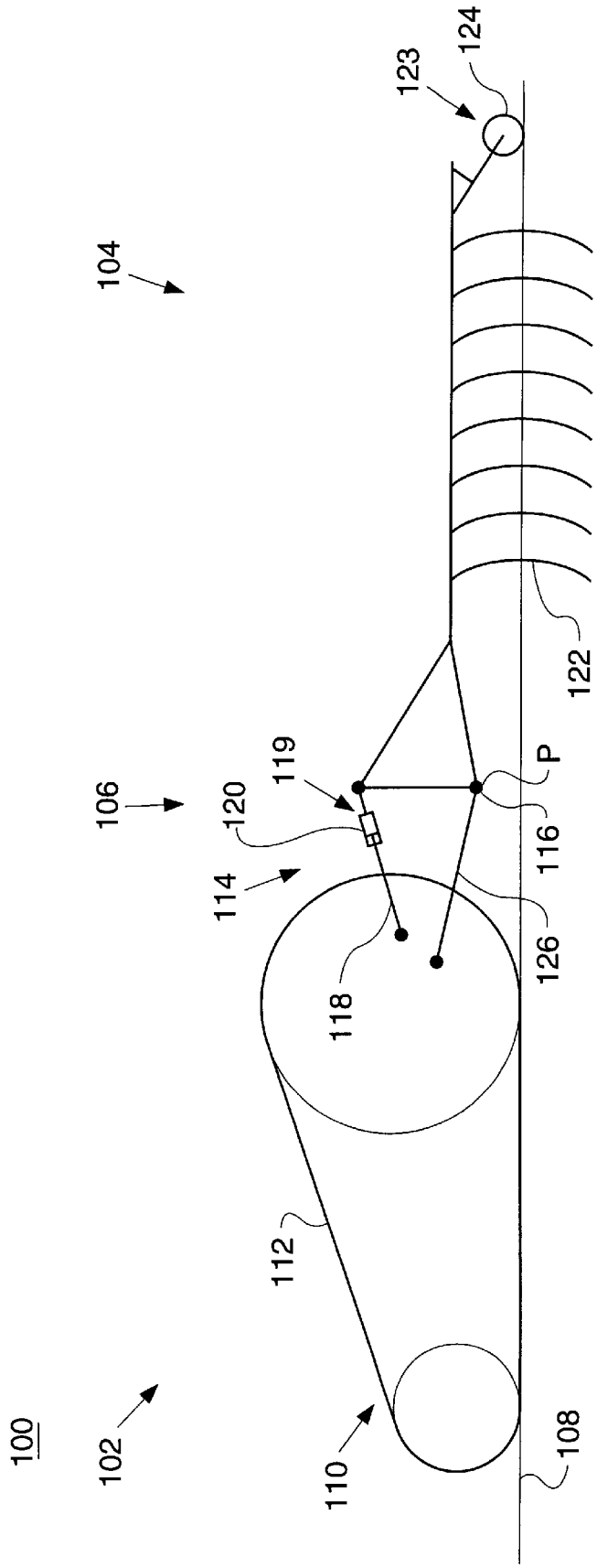
FIG. 1 is a diagrammatic illustration of a work machine having a hitch system and having a work implement attached to the hitch system.

Referring to the drawings, and with particular reference to FIG. 1, a diagrammatic illustration of a preferred embodiment of an apparatus 100 of the present invention is shown. Specifically, FIG. 1 diagrammatically illustrates a work machine 102 having a hitch system 106 connected to the work machine 102, and having a work implement 104 attached to the hitch system 106.

In the example embodied below for purposes of describing the present invention, the work machine 102 is an agricultural tractor having belted tracks 112 for engaging a ground surface 108 for mobility. However, the present invention may equally be used with other types of work machines 102, such as wheeled agricultural tractors, and either tracked or wheeled construction machines.

Typically, the hitch system 106 includes a three point hitch of any of a multitude of three point hitch configurations that are well known in the art. Preferably, a hitch system 106 suitable for use with the present invention would include a hitch 114 for attaching a work implement 104, at least one lower link pin joint 116, a top link 118, a powered linear actuator 119, and a drawbar 126.

In the preferred embodiment, the powered linear actuator 119 is a hydraulic cylinder 120. Alternatively, the powered linear actuator 119 may be of some other type, either hydraulic or mechanical, suitable for applying pressure to the hitch 114. Examples of powered linear actuators may include electrically or hydraulically powered mechanical screws, and the like. For purposes of describing the present invention, however, the powered linear actuator 119 is discussed below with reference to a hydraulic cylinder 120.

Preferably, the hitch 114 includes two lower link pin joints 116, although only one is illustrated in FIG. 1. The top link cylinder 120 is used initially to position the work implement 104 to a desired position. However, as is described below with reference to the present invention, the top link cylinder 120 may then have selective pressures applied during operations to achieve desired load distributions on the work machine 102. The lower link pin joints 116, for purposes of the present invention, are the location of a point P, which is discussed in more detail below. Preferably, the point P may be any point located on an axis (not shown) connecting the two lower link pin joints 116.

A work implement 104 is attached to the hitch system 106 in a manner which allows control over the position of the work implement 104. Preferably, the work implement 104 is adapted to engage the ground to perform a desired work function. For example, the work implement 104 may include an agricultural ground engaging tool 122, such as a plow, disk, or cultivator. In the example illustrated in FIG. 1, a plurality of ground engaging tools 122 are attached to the work implement 104.

The work implement 104 also includes, in the preferred embodiment, at least one gauge mechanism 123 located at a rearward portion of the work implement 104 and adapted to maintain contact with the ground surface 108. In the preferred embodiment, the gauge mechanism 123 is a gauge wheel 124. Alternatively, the gauge mechanism 123 may be a track, skid, or some such suitable device. Hereinafter, discussion is made with reference to a gauge wheel 124 for purposes of describing the present invention.

The gauge wheel 124 provides support at the rear of the work implement 104 to help keep the ground engaging tools 122 in the ground at a desired depth throughout the work process.

Figure 2:
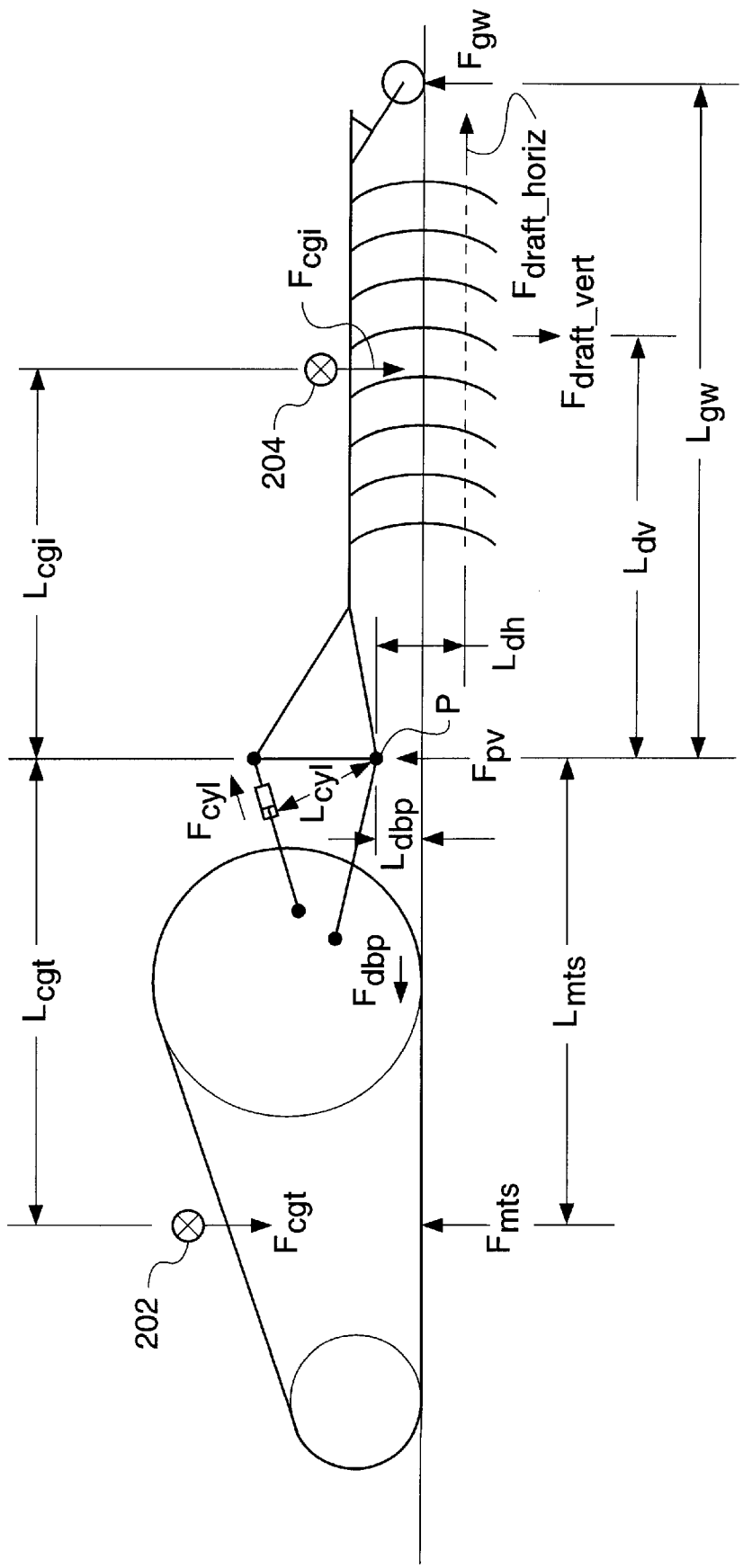
FIG. 2 is the diagrammatic illustration of FIG. 1 showing forces and distances associated with the work machine, hitch system, and work implement.

Referring now to FIG. 2, the diagrammatic illustration of FIG. 1 is shown, with the addition of a plurality of forces and distances shown that are relevant to a preferred embodiment of the present invention. In addition, a center of gravity 202 of the work machine 102, and a center of gravity 204 of the work implement 104 are shown.

The forces shown in FIG. 2 are forces typically encountered during work operations of the work machine 102, hitch system 106, and work implement 104, and are defined below. However, it is noted that additional forces may be present, and the forces depicted for purposes of describing the present invention are not all inclusive.

$F_{cgt}$ is the overall weight of the work machine 102 acting at the center of gravity 202 of the work machine 102. $F_{dbp}$ is the net drawbar pull developed by the work machine 102. $F_{mts}$ is the overall resultant force acting on the track 112. $F_{cyl}$ is the hydraulic top link cylinder force. $F_{pv}$ is the vertical force at the hitch lower link pin joints 116, i.e., at point P. $F_{cgi}$ is the overall weight of the work implement 104 acting at the center of gravity 204. $F_{draft\_horiz}$ is the horizontal force caused by the work implement 104 being pulled through the ground surface 108. $F_{draft\_vert}$ is the overall resultant vertical force caused by the work implement 104 engaging the ground surface 108. $F_{gw}$ is the force acting on the gauge wheel 124 on the work implement 104.

The distances shown in FIG. 2 are distances from the point P at the lower link pin joints 116 on the hitch system 106 to various points on the work machine 102, hitch system 106, and work implement 104, and are defined below. Each distance is determined with respect to a corresponding force, and each distance-force combination is used to determine a moment about the point P, as is described in more detail below.

$L_{cgt}$ is the horizontal distance from the center of gravity 202 of the work machine 102 to the point P. $L_{dbp}$ is the vertical distance from the ground surface 108 to the point P. $L_{mts}$ is the horizontal distance from the location of the resultant track force $F_{mts}$ to the point P. $L_{cyl}$ is the perpendicular distance from the top link cylinder 120 to the point P. $L_{cgi}$ is the horizontal distance from the location of the center of gravity 204 of the work implement 104 to the point P. $L_{dh}$ is the vertical distance from the location of the horizontal implement draft force $F_{draft\_horiz}$ to the point P. $L_{dv}$ is the horizontal distance from the location of the vertical implement draft force $F_{draft\_vert}$ to the point P. $L_{gw}$ is the horizontal distance from the location of the implement gauge wheel force $F_{gw}$ to the point P.

Referring now to FIG. 3, a block diagram illustrating a preferred embodiment of the present invention is shown.

In the preferred embodiment, a plurality of machine parameter sensors 306 and a plurality of implement parameter sensors 308 are adapted to sense parameters of the work machine 102 and the work implement 104. Examples of sensors include, but are not limited to, sensors adapted to sense engine speed, engine acceleration, engine torque, ground speed of the work machine 102, pitch of the work machine 102, pitch of the work implement 104, slip of the tracks 112, load on the drawbar 126, position of the hitch system 106, load and pressure on the hydraulic top link cylinder 120, height of the work implement 104, and the like.

The machine and implement parameter sensors 306,308 may be capable of sensing one or more of the forces and distances defined above or, alternatively, may, individually or in combination, allow the determination of one or more of the forces and distances from sensed parameters. For example, sensors adapted to sense pressure on the hydraulic top link cylinder 120 may be used to sense directly $F_{cyl}$. However, $F_{dbp}$ may be determined indirectly by a combination of sensors including, but not necessarily limited to, sensors for engine speed, engine torque, ground speed, track slip, and drawbar load.

The sensed data from the machine and implement parameter sensors 306,308 are delivered to a controller 302, preferably located on the work machine 102. The controller 302 is adapted to receive the sensed parameters of the work machine 102 and the work implement 104, determine the plurality of forces and distances defined above and illustrated in FIG. 2, and responsively calculate a plurality of moments, each moment being calculated from a determined force and a corresponding determined distance. The controller 302 is further adapted to determine a desired pressure to apply to the hydraulic top link cylinder 120 which would result in the overall resultant force $F_{mts}$ acting on the track 112 to be at a desired distance $L_{mts}$ from the point P.

Preferably, with a work machine 102 having tracks 112 for mobility, the desired distance $L_{mts}$ is at a point substantially near a longitudinal center point of the tracks 112. This location for the force $F_{mts}$ allows the load distribution of the work machine 102 pulling the work implement 104 to be substantially evenly distributed along the entire ground engaging portion of the tracks 112, thus allowing the tracks 112 to be most efficient at moving the work machine 102.

Alternatively, with a work machine 102 having a plurality of wheels for mobility, it may be desired for the distance $L_{mts}$ to be at a location other than at a point substantially near the longitudinal center of the work machine 102. For example, if the prime driving wheels are at the back of the work machine 102, it may be desired to shift the force $F_{mts}$ to a location near the back wheels to increase traction under heavy load conditions, or when wheel slippage is detected. As another example, for a work machine having a plurality of driving wheels, e.g., front and rear, it may be desired to monitor all driving wheels and shift the force $F_{mts}$ to a location near a wheel that is determined to be slipping in order to provide increased traction for the slipping wheel.

A top link control system 304, located on the work machine 102, receives data needed to determine the desired pressure to apply to the hydraulic top link cylinder 120, and responsively applies the desired pressure to the top link cylinder 120 to obtain the desired load distribution point on the work machine 102.

Referring now to FIG. 4, a flow diagram illustrating a preferred method of the present invention is shown.

In a first control block 402, a plurality of forces applied to the work machine 102 and the work implement 104 are determined. In one embodiment of the present invention, the forces applied to the work machine 102 only are determined. In another embodiment of the present invention, the forces applied to the work implement 104 only are determined. In yet another embodiment of the present invention, the forces applied to the work machine 102 and the work implement 104 are determined.

In a second control block 404, a plurality of distances from the point P on the lower link pin joints 116 to various points on the work machine 102, the work implement 104, and the ground surface 108 are determined. In one embodiment, the distances to points on the work machine 102 only are determined. In another embodiment, the distances to points on the work implement 104 only are determined. In yet another embodiment, the distances to points on both the work machine 102 and the work implement 104 are determined. It is noted that some of the distances are known from the specifications of the work machine 102 or the work implement 104, and therefore determination of these known distances is accomplished initially be entering them into the controller 302.

In a third control block 406, a plurality of moments are calculated using the determined forces and corresponding determined distances. In the preferred embodiment, each moment is calculated by multiplying a force by a corresponding distance. Control then proceeds to a fourth control block 408, where the desired pressure to apply to the hydraulic top link cylinder 120 is determined.

In one embodiment of the present invention, the desired pressure is determined from the moments on the work implement 104 about the point P. For example, the sum of the moments about the point P is zero.

$$\Sigma M_{@point\ P} = 0 \quad \text{(Equation 1)}$$

Expressing Equation 1 in terms of the forces and distances:

$$(F_{cyl}*L_{cyl})+(F_{cgi}*L_{cgi})+(F_{draft\_vert}*L_{dv})-(F_{draft\_horiz}*L_{dh})-(F_{gw}*L_{gw})=0 \quad \text{(Equation 2)}$$

Rewriting Equation 2 and solving for $F_{cyl}$:

$$F_{cyl} = \frac{(F_{gw}*L_{gw})-(F_{cgi}*L_{cgi})-(F_{draft\_vert}*L_{dv})+(F_{draft\_horiz}*L_{dh})}{L_{cyl}} \quad \text{(Equation 3)}$$

In another embodiment of the present invention, the desired pressure is determined from the moments on the work machine 102 about the point P. Once again, the sum of the moments about the point P is zero. In addition, the sum of all the vertical forces at the work machine 102 is zero.

$$\Sigma F_{vert} = 0 \quad \text{(Equation 4)}$$

From the sum of the moments equation and the sum of the vertical forces equation:

$$(F_{mts}*L_{mts})+(F_{dbp}*L_{dbp})-(F_{cgt}*L_{cgt})-(F_{cyl}*L_{cyl})=0 \quad \text{(Equation 5)}$$

$$F_{mts}-F_{cgt}-F_{pv}-(F_{cyl}*\sin\theta)=0 \quad \text{(Equation 6)}$$

where θ is the angle of the top link 118 of the hitch system 106 from a horizontal plane, i.e., the angle of the top link cylinder 120 from horizontal.

Rewriting Equations 5 and 6, and substituting terms:

$$L_{mts} = \frac{(F_{cgt} * L_{cgt}) + (F_{cyl} * L_{cyl}) - (F_{dbp} * L_{dbp})}{F_{cgt} + F_{pv} + (F_{cyl} * \sin\theta)} \quad \text{(Equation 7)}$$

$$F_{cyl} = \frac{(F_{cgt} * L_{cgt}) - (F_{dbp} * L_{dbp}) - (F_{cgt} - * L_{mts}) - (F_{pv} * L_{mts})}{(L_{mts} * \sin\theta) - L_{cyl}} \quad \text{(Equation 8)}$$

In one aspect of the invention, Equation 7 can be used to solve for $L_{mts}$ to create a variable which can be used to adjust the top link cylinder force $F_{cyl}$ until $L_{mts}$ is equal to the desired load distribution point, e.g., at midpoint on a work machine 102 having tracks 112.

In another aspect of the invention, $F_{cyl}$ may be determined by Equation 8 and used to adjust the top link cylinder force to maintain the load distribution point at the desired location.

It is noted that either Equation 3 or Equation 8 may be used to determine $F_{cyl}$, which in turn may be used with Equation 7 to determine $L_{mts}$, and responsively control $F_{cyl}$ to achieve the desired $L_{mts}$.

Referring still to FIG. 4, in a fifth control block 410, the desired cylinder force $F_{cyl}$ is applied to the hydraulic top link cylinder 120, preferably by the top link control system 304.

Referring now to FIG. 5, a flow diagram illustrating the steps of determining the forces on the work machine 102 is shown.

In a first control block 502, the weight $F_{cgt}$ of the work machine 102 at the center of gravity 202 of the work machine 102 is determined. Preferably, the weight of the work machine 102 at the center of gravity 202 is fairly constant and is provided by the manufacturer of the work machine 102. However, some factors such as attachments and changing fuel levels may alter the center of gravity 202 and would need to be accounted for.

In a second control block 504, the net drawbar pull $F_{dbp}$ by the work machine 102 is determined. The net drawbar pull may be sensed directly, e.g., with a sensor such as a strain gauge pin, or may be determined from parameters of the work machine 102, such as engine parameters, track or wheel slip, ground speed, and the like.

In a third control block 506, the vertical force $F_{pv}$ at the lower link pin joints 116 is determined. In the preferred embodiment, forces on hydraulic lift cylinders (not shown) on the hitch system 106 are sensed directly, and the force $F_{pv}$ is determined by taking into account the geometry of the hitch system 106.

In a fourth control block 508, the force applied to the hydraulic top link cylinder 120 is determined, preferably by use of one of Equations 3 and 8.

Referring now to FIG. 6, a flow diagram illustrating the steps of determining the forces on the work implement 104 is shown.

In a first control block 602, the weight $F_{cgi}$ of the work implement 104 at the center of gravity 204 is determined. Preferably, the weight $F_{cgi}$ of the work implement 104 at the center of gravity 204 is fairly constant and is provided by manufacturer specifications.

In a second control block 604, the horizontal force $F_{draft\_horiz}$ caused by the ground engaging tools 122 on the work implement 104 being pulled through the ground surface 108 is determined. Preferably, $F_{draft\_horiz}$ is substantially the same as $F_{dbp}$, and is determined by a method such as one of the examples described above for $F_{dbp}$.

In a third control block 606, the vertical force $F_{draft\_vert}$ caused by the ground engaging tools 122 on the work implement 104 being engaged into the ground surface 108 is determined. This force generally acts to pull the ground engaging tools 122 deeper into the ground, and may be sensed by the use of strain gauges on the work implement 104.

In a fourth control block 608, the force $F_{gw}$ acting on the gauge wheel 124 on the work implement 104 is determined, for example, by the use of strain gauges. Control then proceeds to a fifth control block 610, where the force $F_{cyl}$ applied to the hydraulic top link cylinder 120 is determined, preferably by the methods described above.

It is noted that the methods described above for determining the forces on the work machine 102, hitch system 106, and work implement 104 are exemplary methods only and do not exhaust the possibilities that may exist for determining the forces. Additional and alternative methods for determining the forces, either directly or indirectly, may be used without deviating from the spirit of the present invention.

Referring now to FIG. 7, a flow diagram illustrating the steps of determining the distances from the point P to various points on the work machine 102 is shown.

In a first control block 702, the horizontal distance $L_{cgt}$ from the center of gravity 202 of the work machine 102 to the point P is determined. Preferably, the location of the center of gravity 202 is known from manufacturer specifications, as well as all other needed dimensions of the work machine 102 and the hitch system 106. In addition, the position of the point P relative to the movements of the hitch system 106 may be determined by position sensors. From this, $L_{cgt}$ may be calculated by the controller 302.

In a second control block 704, the vertical distance $L_{dbp}$ from the ground surface 108, i.e., the drawbar pull point, to the point P is determined. The same known information for the determination of $L_{cgt}$ may be used to calculate $L_{dbp}$.

In a third control block 706, the horizontal distance $L_{mts}$ from the load distribution point of the work machine 102 to the point P is determined. As described above, $L_{mts}$ is determined from Equation 7.

In a fourth control block 708, the perpendicular distance $L_{cyl}$ from the hydraulic top link cylinder 120 to the point P is determined. In the preferred embodiment, the distance $L_{cyl}$ is calculated from known dimensions and the known geometry of the hitch system 106, including sensed changes in the position of the top link 118 relative to the lower link pin joints 116.

Referring now to FIG. 8, a flow diagram illustrating the steps of determining the distances from the point P to various points on the work implement 104 is shown.

In a first control block 802, the horizontal distance $L_{cgi}$ from the center of gravity 204 of the work implement 104 to the point P is determined, preferably in a manner similar to that described above with respect to the distance $L_{cgt}$.

In a second control block 804, the vertical distance $L_{dh}$ from the location of the horizontal force $F_{draft\_horiz}$, caused by the ground engaging tools 122 being pulled through the ground surface 108, to the point P is determined. In the preferred embodiment, $L_{dh}$ is determined empirically using information such as the known dimensions of the work implement 104 and the depth of the ground engaging tools 122 into the ground surface 108. Additional information such as ground speed and draft force may be used for increased accuracy.

In a third control block 806, the horizontal distance $L_{dv}$ from the location of the vertical force $F_{draft\_vert}$, caused by the ground engaging tools 122 being engaged into the ground surface 108, to the point P is determined. Preferably, it is assumed that $F_{draft\_vert}$ is evenly distributed along the longitudinal portion of the ground engaging tools 122, and that therefore the location of $F_{draft\_vert}$ is substantially at the longitudinal center of the ground engaging tools 122. Using this assumption, the distance $L_{dv}$ may be determined. However, the location of $F_{draft\_vert}$ may be determined to be offset from the center, and thus the distance $L_{dv}$ would change accordingly.

In a fourth control block 808, the horizontal distance $L_{gw}$ from the location of the force $F_{gw}$, applied to the gauge wheel 124, to the point P is determined. The known dimensions of the work implement 104 and the hitch system 106 may be used to calculate $L_{gw}$.

In a fifth control block 810, the perpendicular distance $L_{cyl}$ from the hydraulic top link cylinder 120 to the point P is determined, as described above.

It is noted that the methods described above for determining the distances from the point P to the various points on the work machine 102, hitch system 106, and work implement 104 are exemplary methods only and do not exhaust the possibilities that may exist for determining the distances. Additional and alternative methods for determining the distances, either directly or indirectly, may be used without deviating from the spirit of the present invention.

Industrial Applicability

As an example of an application of the present invention, agricultural tractors having tracked drive systems are becoming increasingly common due to increased traction and improved flotation over the ground. However, the advantages of using tracks is optimized when the load distribution on the tractor is evenly distributed along the ground engaging portion of the tracks, as opposed to concentrating the load distribution at the drive wheels of a wheeled tractor. The present invention offers the advantage of distributing the load on the tractor as desired without having to compromise the depth of the work implement to do so.

Other aspects, objects, and features of the present invention can be obtained from a study of the drawings, the disclosure, and the appended claims.

What is claimed is:

1. A method for controlling a hitch system on a work machine, the hitch system having a work implement attached, including the steps of:
   determining at least one force applied to at least one of the work machine and the work implement;
   determining at least one distance from a predetermined point on the hitch system to a desired at least one point on at least one of the work machine and the work implement;
   calculating at least one moment for at least one of the work machine and the work implement, each moment being calculated from a determined force and a corresponding determined distance;
   responsively determining a desired pressure to apply to a powered linear actuator located on the hitch system to obtain a desired load distribution point on the work machine; and
   applying the desired pressure to the powered linear actuator.

2. A method, as set forth in claim 1, wherein the powered linear actuator is a hydraulic cylinder.

3. A method, as set forth in claim 2, wherein the hydraulic cylinder is located at a top link of the hitch system.

4. A method, as set forth in claim 3, wherein determining at least one force applied to the work machine includes determining a plurality of forces, including the steps of:
   determining a weight of the work machine at a center of gravity of the work machine;
   determining a net drawbar pull by the work machine;
   determining a resultant force on at least one of a plurality of wheels and a plurality of tracks on the work machine;
   determining a force applied to the hydraulic cylinder on the hitch system; and
   determining a vertical force at a lower link pin joint on the hitch system.

5. A method, as set forth in claim 3, wherein determining at least one force applied to the work implement includes determining a plurality of forces, including the steps of:
   determining a weight of the work implement at a center of gravity of the work implement;
   determining a horizontal force caused by the work implement being pulled through the ground;
   determining a vertical force caused by the work implement being engaged in the ground;
   determining a force applied to a gauge mechanism located at a rearward portion of the work implement; and
   determining a force applied to the hydraulic cylinder on the hitch system.

6. A method, as set forth in claim 5, wherein the gauge mechanism is a gauge wheel.

7. A method, as set forth in claim 3, wherein the predetermined point on the hitch system is a point (P) located at a lower link pin joint on the hitch system.

8. A method, as set forth in claim 7, wherein determining at least one distance from the point P on the hitch system to a desired at least one point on the work machine includes determining a plurality of distances, including the steps of:
   determining a horizontal distance from a center of gravity of the work machine to the point P;
   determining a vertical distance from the ground to the point P;
   determining a horizontal distance from the location of a resultant force on at least one of a plurality of wheels and a plurality of tracks on the work machine to the point P; and
   determining a perpendicular distance from the hydraulic cylinder at the top link of the hitch system to the point P.

9. A method, as set forth in claim 7, wherein determining at least one distance from the point P on the hitch system to a desired at least one point on the work implement includes determining a plurality of distances, including the steps of:
   determining a horizontal distance from the location of a center of gravity of the work implement to the point P;
   determining a vertical distance from the location of a horizontal force caused by the work implement being pulled through the ground to the point P;
   determining a horizontal distance from the location of a vertical force caused by the work implement being engaged in the ground to the point P;
   determining a horizontal distance from the location of a force applied to a gauge mechanism located at a rearward portion of the work implement to the point P; and
   determining a perpendicular distance from the hydraulic cylinder at the top link of the hitch system to the point P.

10. A method, as set forth in claim 9, wherein the gauge mechanism is a gauge wheel.

11. A method, as set forth in claim 1, wherein calculating a moment includes the step of multiplying a determined force by a corresponding determined distance.

12. A method, as set forth in claim 4, wherein the desired load distribution point on the work machine is the desired location of the resultant force on at least one of a plurality of wheels and a plurality of tracks on the work machine.

13. A method, as set forth in claim 12, wherein the desired location of the resultant force on a work machine having a plurality of tracks is substantially near a center point on the tracks, wherein the resultant force responsively is substantially evenly distributed along the ground engaging portion of the tracks.

14. An apparatus for controlling a hitch system on a work machine, the hitch system having a work implement attached, comprising:

means for determining a plurality of forces applied to at least one of the work machine and the work implement;

means for determining a plurality of distances from a predetermined point on the hitch system to a desired plurality of points on at least one of the work machine and the work implement;

means for calculating a plurality of moments for at least one of the work machine and the work implement, each moment being calculated from a determined force and a corresponding determined distance;

means for responsively determining a desired pressure to apply to a hydraulic cylinder located on the hitch system to obtain a desired load distribution point on the work machine; and means for applying the desired pressure to the hydraulic cylinder.

15. An apparatus, as set forth in claim 14, wherein means for determining a plurality of forces applied to the work machine includes:

means for determining a weight of the work machine at a center of gravity of the work machine;

means for determining a net drawbar pull by the work machine;

means for determining a resultant force on at least one of a plurality of wheels and a plurality of tracks on the work machine;

means for determining a force applied to the hydraulic cylinder on the hitch system, wherein the hydraulic cylinder is located at a top link of the hitch system; and means for determining a vertical force at a lower link pin joint on the hitch system.

16. An apparatus, as set forth in claim 14, wherein means for determining a plurality of forces applied to the work implement includes:

means for determining a weight of the work implement at a center of gravity of the work implement;

means for determining a horizontal force caused by the work implement being pulled through the ground;

means for determining a vertical force caused by the work implement being engaged in the ground;

means for determining a force applied to a gauge wheel located at a rearward portion of the work implement; and means for determining a force applied to the hydraulic cylinder on the hitch system, wherein the hydraulic cylinder is located at a top link of the hitch system.

17. An apparatus, as set forth in claim 14, wherein the predetermined point on the hitch system is a point (P) located at a lower link pin joint on the hitch system, and wherein means for determining a plurality of distances from the point P on the hitch system to a desired plurality of points on the work machine includes:

means for determining a horizontal distance from a center of gravity of the work machine to the point P;

means for determining a vertical distance from the ground to the point P;

means for determining a horizontal distance from the location of a resultant force on at least one of a plurality of wheels and a plurality of tracks on the work machine to the point P; and means for determining a perpendicular distance from the hydraulic cylinder to the point P, wherein the hydraulic cylinder is located at a top link of the hitch system.

18. An apparatus, as set forth in claim 14, wherein the predetermined point on the hitch system is a point (P) located at a lower link pin joint on the hitch system, and wherein means for determining a plurality of distances from the point P on the hitch system to a desired plurality of points on the work implement includes:

means for determining a horizontal distance from the location of a center of gravity of the work implement to the point P;

means for determining a vertical distance from the location of a horizontal force caused by the work implement being pulled through the ground to the point P;

means for determining a horizontal distance from the location of a vertical force caused by the work implement being engaged in the ground to the point P;

means for determining a horizontal distance from the location of a force applied to a gauge wheel located at a rearward portion of the work implement to the point P; and means for determining a perpendicular distance from the hydraulic cylinder to the point P, wherein the hydraulic cylinder is located at a top link of the hitch system.

19. An apparatus, as set forth in claim 14, wherein means for calculating a moment includes means for multiplying a determined force by a corresponding determined distance.

20. An apparatus, as set forth in claim 15, wherein the desired load distribution point on the work machine is the desired location of the resultant force on at least one of a plurality of wheels and a plurality of tracks on the work machine.

21. An apparatus, as set forth in claim 20, wherein the desired location of the resultant force on a work machine having a plurality of tracks is substantially near a center point on the tracks, wherein the resultant force responsively is substantially evenly distributed along the ground engaging portion of the tracks.

22. An apparatus for controlling a hitch system on a work machine, the hitch system having a work implement attached, comprising:

a plurality of machine parameter sensors for determining a plurality of parameters of the work machine;

a plurality of implement parameter sensors for determining a plurality of parameters of the work implement;

a controller for receiving the parameters of the work machine and the work implement, determining at least one force applied to at least one of the work machine and the work implement, determining at least one distance from a predetermined point on the hitch system to a desired at least one point on at least one of the work machine and the work implement, calculating at least one moment for at least one of the work machine and the work implement, each moment being calculated from a determined force and a corresponding determined distance, and responsively determining a desired pressure to apply to a powered linear actuator located on the hitch system; and a top link control system for receiving a desired pressure signal from the controller and responsively applying the desired pressure to the powered linear actuator to obtain a desired load distribution point on the work machine.

23. An apparatus, as set forth in claim 22, wherein the powered linear actuator is a hydraulic cylinder.

24. An apparatus, as set forth in claim 22, wherein the work machine is an agricultural tractor.

25. An apparatus, as set forth in claim 24, wherein the agricultural tractor is a track-type tractor having a plurality of tracks for movement of the tractor.

26. An apparatus, as set forth in claim 22, wherein the work implement includes at least one ground engaging tool.

27. An apparatus, as set forth in claim 23, wherein the hitch system includes a three point hitch.

28. An apparatus, as set forth in claim 27, wherein the hitch system includes a hitch top link including the hydraulic cylinder, and a hitch lower link pin.

29. An apparatus, as set forth in claim 28, wherein the hitch lower link pin is at a point P with reference to the work machine, hitch system, and work implement.

30. An apparatus, as set forth in claim 26, wherein the work implement includes at least one gauge mechanism located at a rearward portion of the work implement and adapted to maintain contact with the ground.

31. An apparatus, as set forth in claim 30, wherein the gauge mechanism is a gauge wheel.

\* \* \* \* \*